United States Patent
Whittle (10) Patent No.: US 10,859,268 B2
(45) Date of Patent: Dec. 8, 2020

(54) CERAMIC MATRIX COMPOSITE TURBINE VANES AND VANE RING ASSEMBLIES

(71) Applicant: Rolls-Royce plc, London (GB)

(72) Inventor: Michael J. Whittle, Derby (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 16/150,941

(22) Filed: Oct. 3, 2018

(65) Prior Publication Data

US 2020/0109858 A1    Apr. 9, 2020

(51) Int. Cl.
  *F23R 3/16* (2006.01)
  *F01D 5/28* (2006.01)
  *F01D 9/04* (2006.01)
  *F01D 9/02* (2006.01)

(52) U.S. Cl.
  CPC ............... *F23R 3/16* (2013.01); *F01D 5/284* (2013.01); *F01D 9/023* (2013.01); *F01D 9/042* (2013.01); *F05D 2300/6033* (2013.01); *F23R 2900/00012* (2013.01)

(58) Field of Classification Search
  CPC .. F23R 3/16; F23R 2900/00012; F01D 5/284; F01D 9/023; F01D 9/042; F01D 9/041; F05D 2300/6033; F05D 2240/80; F05D 2240/91
  See application file for complete search history.

(56) References Cited

U.S. PATENT DOCUMENTS

| | | | |
|---|---|---|---|
| 6,325,593 B1 | 12/2001 | Darkins, Jr. et al. | |
| 6,514,046 B1 | 2/2003 | Morrison et al. | |
| 6,558,114 B1 | 5/2003 | Tapley et al. | |
| 6,648,597 B1 | 11/2003 | Widrig et al. | |
| 7,762,766 B2 | 7/2010 | Shteyman et al. | |
| 8,251,652 B2 * | 8/2012 | Campbell | F01D 5/189 415/209.3 |
| 8,454,303 B2 | 6/2013 | Garcia-Crespo | |
| 8,709,314 B2 | 4/2014 | Mahieu et al. | |
| 8,926,262 B2 | 1/2015 | Tanahashi et al. | |
| 9,080,454 B2 | 7/2015 | Coupe et al. | |
| 9,097,141 B2 | 8/2015 | Paradis | |
| 9,212,560 B2 | 12/2015 | McCaffrey | |
| 9,546,557 B2 | 1/2017 | Grooms, III et al. | |
| 9,915,159 B2 | 3/2018 | Huizenga et al. | |
| 10,174,627 B2 | 1/2019 | Chang et al. | |
| 2013/0052030 A1 * | 2/2013 | McCaffrey | B29C 70/00 416/241 B |
| 2013/0251939 A1 * | 9/2013 | Kleinow | B32B 18/00 428/121 |
| 2014/0001285 A1 | 1/2014 | Grooms, III et al. | |
| 2014/0255174 A1 | 9/2014 | Duelm et al. | |
| 2014/0271208 A1 * | 9/2014 | Garcia-Crespo | F01D 5/30 416/194 |
| 2014/0356151 A1 | 12/2014 | Fremont et al. | |
| 2015/0003989 A1 | 1/2015 | Uskert et al. | |
| 2015/0016972 A1 | 1/2015 | Freeman et al. | |

(Continued)

*Primary Examiner* — Nathaniel E Wiehe
*Assistant Examiner* — Ryan C Clark
(74) *Attorney, Agent, or Firm* — Barnes & Thornburg LLP (57) ABSTRACT

The present disclosure is related to turbine vanes comprising ceramic matrix composite materials and vane ring assemblies including the same. The turbine vane may include mount extensions that extend outside a primary gas path to provide a point of coupling for attaching the turbine vane to a support structure.

11 Claims, 4 Drawing Sheets

(56) References Cited

U.S. PATENT DOCUMENTS

| | | |
|---|---|---|
| 2015/0040396 A1 | 2/2015 | Fremont et al. |
| 2016/0003072 A1 | 1/2016 | Chang et al. |
| 2016/0123164 A1* | 5/2016 | Freeman ............... F01D 25/005 |
| | | 415/200 |
| 2016/0177761 A1 | 6/2016 | Huizenga et al. |
| 2016/0201488 A1 | 7/2016 | Carr et al. |
| 2016/0245103 A1 | 8/2016 | Gimat et al. |
| 2017/0022833 A1 | 1/2017 | Heitman et al. |
| 2017/0051619 A1 | 2/2017 | Tuertscher |
| 2017/0298748 A1* | 10/2017 | Vetters ................. F01D 25/005 |
| 2018/0045117 A1 | 2/2018 | Groves, II et al. |
| 2018/0179906 A1 | 6/2018 | Schetzel et al. |
| 2018/0223680 A1 | 8/2018 | Hafner |
| 2018/0230823 A1* | 8/2018 | Sippel .................... F01D 5/147 |
| 2018/0328187 A1 | 11/2018 | Oke |
| 2018/0340431 A1 | 11/2018 | Kerns et al. |
| 2018/0370158 A1 | 12/2018 | Gather et al. |

* cited by examiner

CERAMIC MATRIX COMPOSITE TURBINE VANES AND VANE RING ASSEMBLIES

FIELD OF THE DISCLOSURE

The present disclosure relates generally to vanes used in gas turbine engines, and more specifically to vanes incorporating ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

A vane ring assembly for use in a gas turbine engine may include a plurality of individual turbine vanes and a support structure. The turbine vanes may be made of ceramic matrix composite materials and are arranged circumferentially adjacent to one another to form a ring that extends around a central axis. The support structure comprises metallic materials and engages a mount extension included in the turbine vane to couple the turbine vane to the support structure and provide a simply supported load path from an airfoil of the turbine vane to the support structure so that aerodynamic loading of the airfoil may be directly transmitted from the airfoil to the support structure.

In some embodiments, the turbine vane includes an airfoil, inner and outer platforms, and inner and outer mount extensions. The airfoil is shaped to redirect air moving through a primary gas path within the gas turbine engine. The platforms extend circumferentially from the airfoil at least partway about the central axis to define a boundary of the primary gas path. The mount extensions extend outside the primary gas path to provide a point of coupling for attaching the turbine vane to a support structure at a location where temperatures may be lower than within the primary gas path.

In some embodiments, at least some components of the airfoil are arranged within an airfoil footprint of the airfoil arranged in the primary gas path when the turbine vane is viewed in a radially-inwardly looking direction toward the central axis.

In some embodiments, the mount extension includes at least some components of the airfoil that extend through the platform and out of the primary gas path so that aerodynamic loading of the airfoil may be directly transmitted from the airfoil to the support structure.

In some embodiments, the airfoil includes an airfoil core tube, an airfoil cover ply, and an airfoil trailing edge fill body. The airfoil core tube is shaped to form a passageway that extends radially through the airfoil. The airfoil cover ply is arranged around the airfoil core tube and the airfoil trailing edge fill body to provide an outer surface of the airfoil within the primary gas path. The airfoil cover ply shields the airfoil core tube and the airfoil trailing edge fill body from air moving through the primary gas path.

In some embodiments, the platform includes platform panel and a platform ply. The platform panel extends circumferentially from the airfoil at least partway about the central axis to define a boundary of the primary gas path. The platform ply is arranged so that if forms a radially facing outer surface of the platform.

In some embodiments, the mount extension further includes an extension over ply of reinforcement material, an extension fill body, and a plurality of datum features. The extension over ply is arranged around at least some of the components of the airfoil outside of the primary gas path to provide an outer surface of the mount extension facing circumferentially relative to the central axis away from the components of the airfoil outside the primary gas path. The plurality of datum features extend out of the airfoil footprint when the turbine vane is viewed in a radially-inwardly looking direction toward the central axis. The plurality of datum features are configured to be machined so as to control location of the turbine vane relative to the support structure.

In some embodiments, the extension over ply of reinforcement material includes a mount portion, a fillet portion, and a retainer portion. The mount portion provides the outer surface of the mount extension. The fillet portion extends radially from the mount portion toward the platform and is shaped to provide a radius at the interface of the platform and the mount extension. The retainer portion extends circumferentially along a radially facing surface of platform and is sandwiched radially between the platform panel and the platform ply of the platform.

According to another aspect of the present disclosure, a turbine vane may include an airfoil, inner and outer platforms, and inner and outer mount extensions. The airfoil is shaped to redirect air moving through a primary gas path within the gas turbine engine. The platforms extend circumferentially from the airfoil at least partway about the central axis to define a boundary of the primary gas path. The mount extensions extend outside the primary gas path to provide a point of coupling for attaching the turbine vane to a support structure.

In some embodiments, at least some components of the airfoil are arranged within an airfoil footprint of the airfoil arranged in the primary gas path when the turbine vane is viewed in a radially-inwardly looking direction toward the central axis.

In some embodiments, the mount extension includes at least some components of the airfoil that extend through the platform and out of the primary gas path so that aerodynamic loading of the airfoil may be directly transmitted from the airfoil to the support structure.

In some embodiments, the airfoil includes an airfoil core tube, an airfoil cover ply, and an airfoil trailing edge fill body. The airfoil core tube is shaped to form a passageway that extends radially through the airfoil. The airfoil cover ply is arranged around the airfoil core tube and the airfoil trailing edge fill body to provide an outer surface of the airfoil within the primary gas path. The airfoil cover ply shields the airfoil core tube and the airfoil trailing edge fill body from air moving through the primary gas path. The airfoil trailing edge fill body is shaped to form the trailing edge of the airfoil.

In some embodiments, the airfoil cover ply includes an airfoil interior cover ply and an airfoil exterior cover ply. The interior cover ply is arranged around the at least some components of the airfoil and extends between a radially outermost end of the turbine vane and a radially innermost end of the turbine vane. The exterior cover ply is arranged around the airfoil core tube, the airfoil trailing edge fill body, and the interior cover ply within the primary gas path.

In some embodiments, the airfoil further includes an airfoil fill body. The airfoil fill body is arranged around at least some of the components of the airfoil inside of the primary gas path at the interface of the platform and the airfoil.

In some embodiments, the airfoil exterior cover ply includes an airfoil portion, a fillet portion, and a retainer portion. The airfoil portion provides the inner surface of the airfoil interacting with the air moving through the primary gas path. The fillet portion extends radially from the airfoil portion toward the platform. The fillet portion is shaped to provide a radius at the interface of the platform and the airfoil and engages the airfoil fill body. The retainer portion extends circumferentially along a radially facing surface of platform.

In some embodiments, the platform includes platform panel, an exterior platform ply, and an interior platform ply. The platform panel extends circumferentially from the airfoil at least partway about the central axis to define a boundary of the primary gas path. The exterior platform ply is arranged so that it forms a radially facing outer surface of the platform. The interior platform ply is arranged so that it forms a radially facing inner surface of the platform.

In some embodiments, the mount extension further includes an extension over ply of reinforcement material, an extension fill body, and a plurality of datum features. The extension over ply is arranged around at least some of the components of the airfoil 16 outside of the primary gas path to provide an outer surface of the mount extension facing circumferentially relative to the central axis away from the components of the airfoil outside the primary gas path. The plurality of datum features extend out of the airfoil footprint when the turbine vane is viewed in a radially-inwardly looking direction toward the central axis. The plurality of datum features are configured to be machined so as to control location of the turbine vane relative to the support structure.

In some embodiments, the extension over ply of reinforcement material includes a mount portion, a fillet portion, and a retainer portion. The mount portion provides the outer surface of the mount extension. The fillet portion extends radially from the mount portion toward the platform and is shaped to provide a radius at the interface of the platform and the mount extension. The retainer portion extends circumferentially along a radially facing surface of platform and is sandwiched radially between the platform panel and the platform ply of the platform.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figures 1, 2, 3:
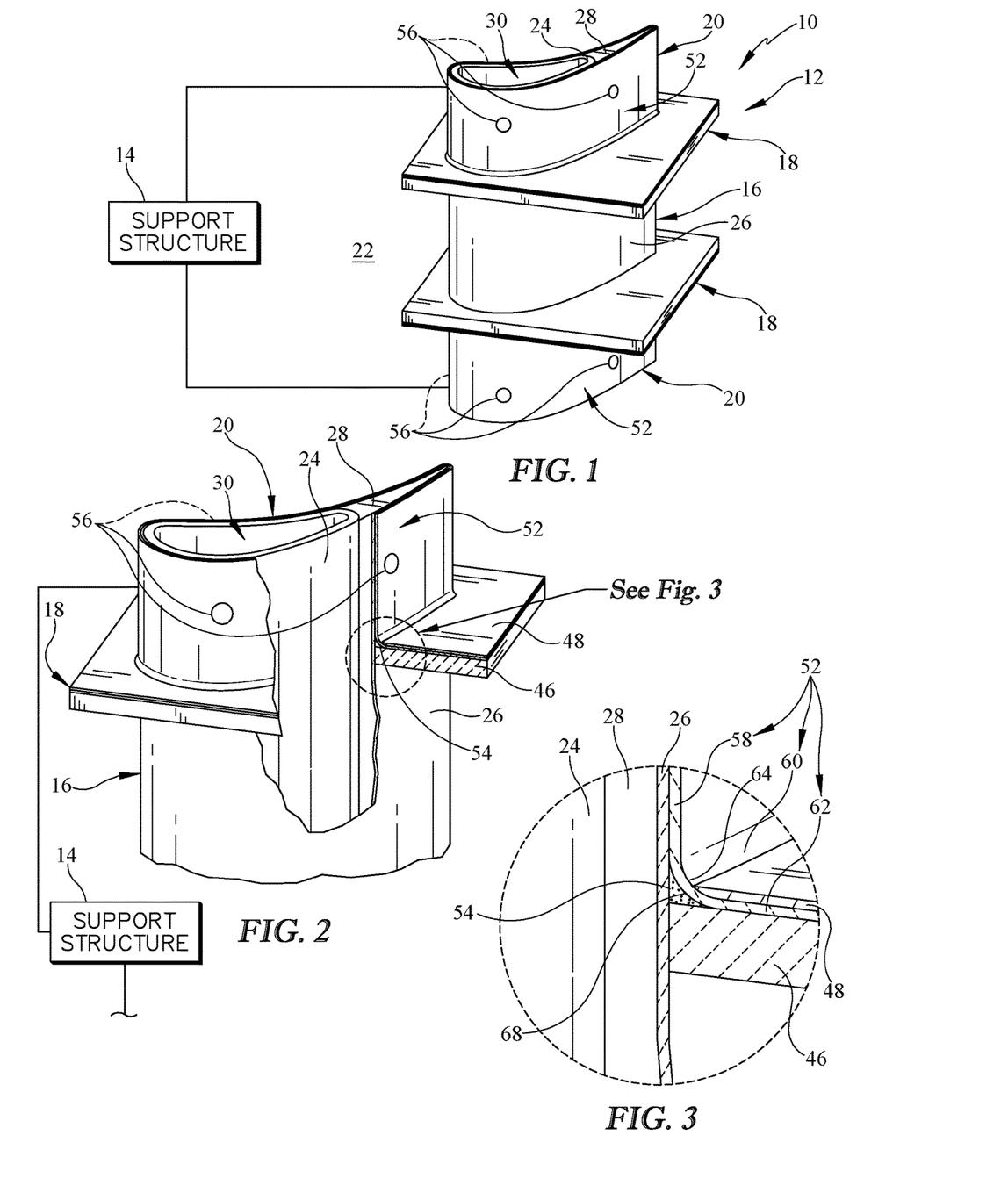
FIG. 1 is a perspective view of a turbine vane made of ceramic matrix composite material for use in a gas turbine engine showing that the vane includes an airfoil shaped to redirect air moving through a primary gas path in the gas turbine engine, inner and outer platforms that define a boundary of the primary gas path, and inner and outer mount extensions that extend outside the primary gas path to provide a point of coupling for attaching the turbine vane to a support structure.
FIG. 2 is a detail view of the turbine vane of FIG. 1 showing a portion of an airfoil cover ply included in the airfoil and a portion of the extension over ply included in the mount extension broken away to show an airfoil core tube and an airfoil trailing edge body of the airfoil extending out of the gas path and the separate layers forming the platform and the mount extension which together to form an integral one piece turbine vane.
FIG. 3 is a detail view of the turbine vane of FIG. 2 showing the extension over ply includes a mount portion that provides the outer surface of the mount extension, a fillet portion shaped to provide a radius at the interface of the platform and mount extension, and a retainer portion that extends over a radially facing surface of the platform and sandwiched between a platform panel and a platform ply included in the platform.

A portion of a vane ring assembly 10 for use in a gas turbine engine is shown illustratively in FIG. 1. The vane ring assembly 10 is made up of a plurality of individual turbine vanes 12 and a support structure 14. The turbine vanes 12 comprise ceramic matrix composite materials and are arranged circumferentially adjacent to one another to form a ring that extends around a central axis. The support structure 14, shown diagrammatically in FIG. 1, comprises metallic materials and engages a mount extension 20 included in the turbine vane 12 to couple the turbine vane 12 to the support structure 14 to provide a simply supported load path from an airfoil 16 of the turbine vane 12 to the support structure 14 so that aerodynamic loading of the airfoil 16 may be directly transmitted from the airfoil 16 to the support structure 14. In some embodiments, the support structure 14 may be adapted for mounting in a ring or to a turbine case included in the vane ring assembly 10.

The turbine vane 12 includes an airfoil 16, inner and outer platforms 18, and inner and outer mount extensions 20 as shown in FIGS. 1 and 2. The airfoil 16 is shaped to redirect air moving through a primary gas path 22 within the gas turbine engine. The platforms 18 extend circumferentially from the airfoil 16 at least partway about the central axis to define a boundary of the primary gas path 22. The mount extensions 20 extend outside the primary gas path 22 to provide a point of coupling for attaching the turbine vane 12 to a support structure 14 at a location where temperatures may be lower than within or adjacent to the primary gas path.

The mount extension 20 includes at least some components of the airfoil 16 that extend through the platform 18 and out of the primary gas path 22 as shown in FIGS. 1 and 2. Accordingly, aerodynamic loading of the airfoil may be directly transmitted from the airfoil 16 to the support structure 14. In the illustrative embodiment, the mount extension 20 includes all of the components of the airfoil 16 that extend through the platform 18 and out of the primary gas path 22. In other embodiments, the mount extension 20 may only include some components of the airfoil 16 as described herein. In the illustrative embodiment, components of the airfoil 16 that also provide part of the mount extensions 20 are arranged within a footprint of the airfoil 16 arranged in the primary gas path 22 when the turbine vane 12 is viewed in a radially-inwardly looking direction toward the central axis.

In the illustrative embodiment, the airfoil 16, the platforms 18, and the mount extensions 20 come together to form one integral, single-piece turbine vane 12 as shown in FIG. 1. The interface between the airfoil 16, the platform 18, and the mount extension 20 forms a joint therebetween. The joint is reinforced with several reinforcement layers comprising ceramic matrix composite material that are arranged to form a fillet at the joint outside of the gas path 22. The layers and fillet reinforcing the joint between the airfoil 16, the platform 18, and the mount extension 20 once assembled are infiltrated with matrix material to create one integral single piece turbine vane with no air leakage between the airfoil 16 and the platforms 18.

The construction of the turbine vane 12, and in particular of the ceramic-containing reinforcements in the part, is shown in the illustrative embodiments of FIGS. 1-3. The airfoil 16 includes an airfoil core tube 24, an airfoil cover ply 26, and an airfoil trailing edge fill body 28 as shown in FIGS. 1-3. The airfoil core tube 24 is shaped to form a passageway 30 that extends radially through the airfoil 16. The airfoil cover ply 26 is arranged around the airfoil core tube 24 and the airfoil trailing edge fill body 28 to provide an outer surface of the airfoil 16 within the primary gas path 22. The airfoil cover ply 26 shields the airfoil core tube 24 and the airfoil trailing edge fill body 28 from air moving through the primary gas path 22. The airfoil trailing edge fill body 28 is shaped to form the trailing edge of the airfoil 16. In the illustrative embodiment, the airfoil core tube 24, the airfoil cover ply 26, and the airfoil trailing edge fill body 28 all extend through the platform 18 and out of the primary gas path 22 to provide part of the mount extension 20.

In some embodiments, the airfoil cover ply 26 may have excess material that extends from the trailing edge of the airfoil 16. The excess of material would allow for trailing edge machining operations and improve the aerodynamics of the airfoil 16. However, the portion of the airfoil trailing edge fill body 28 and airfoil cover ply 26 outside of the gas path 22 forming the mount extension 20 would not be machined.

The platform 18 includes platform panel 46 and a platform ply 48 as shown in FIGS. 2 and 3. The platform panel 46 extends circumferentially from the airfoil 16 at least partway about the central axis to define a boundary of the primary gas path 22. The platform ply 48 is arranged so that if forms a radially facing outer surface of the platform 18.

The mount extension 20 further includes an extension over ply of reinforcement material 52, an extension fill body 54, and a plurality of datum features 56 as shown in FIGS. 1-3. The extension over ply 52 is arranged around at least some of the components of the airfoil 16 outside of the primary gas path 22 to provide an outer surface of the mount extension 20 facing circumferentially relative to the central axis away from the components of the airfoil 16 outside the primary gas path 22. The extension fill body 54 is arranged around at least some of the components of the airfoil 16 outside of the primary gas path 22 at the interface of the platform 18 and the mount extension 20. The plurality of datum features 56 extend out of the airfoil footprint when the turbine vane 12 is viewed in a radially-inwardly looking direction toward the central axis. The plurality of datum features 56 are configured to be machined so as to control location of the turbine vane 12 relative to the support structure 14.

In the illustrative embodiment, the datum features 56 extend outside of the airfoil footprint when the turbine vane is viewed in a radially-inwardly looking direction toward the central axis and directly engage the support structure 14. The direct engagement of the datum features 56 to the support structure 14 allows for the aerodynamic load to be transferred from the airfoil 16 to the support structure 14.

In the illustrative embodiment, the datum features 56 have a circular cross-sectional shape when viewed from a side of the turbine vane 12. In other embodiments, the datum features 56 may have other suitable cross-sectional shapes.

In the illustrative embodiment, the extension over ply 52 is arranged around the airfoil core tube 24, the airfoil cover ply 26, and the airfoil trailing edge fill body 28. In other embodiments, the extension over ply 52 may be arranged around only the airfoil core tube 24.

The extension over ply of reinforcement material 52 includes a mount portion 58, a fillet portion 60, and a retainer portion 62 as shown in FIGS. 2 and 3. The mount portion 58 provides the outer surface of the mount extension 20. The fillet portion 60 extends radially from the mount portion 58 toward the platform 18. The fillet portion 60 is shaped to provide a radius 64 at the interface of the platform 18 and the mount extension 20 and engages the extension fill body 54. The retainer portion 62 extends circumferentially along a radially facing surface of platform 18 and is sandwiched radially between the platform panel 46 and the platform ply 48 of the platform 18.

The layering of the different ply and fill body components 26, 48, 52, 54 reinforces and seal the joint between the airfoil 16, the platform 18, and the mount extension 20 so that no air leaks from the primary gas path 22. In the illustrative embodiment, the layering of the different components is located at the joint outside of the gas path 22. In other embodiments, additional layering may be included at the joint within the primary gas path 22.

In the illustrative embodiment, the radius 64 of the fillet portion 60 of the extension over ply 52 is complementary to a radius 68 of the extension fill body 54. In some embodiments, the extension fill body 54 may increase in size and therefore resulting in the fillet portion 60 of the extension over ply 52 having a greater radius. In other embodiments, the mount portion 58 of the extension over ply 52 may have a greater thickness so that the datum features 56 may be machined more easily.

The turbine vane 12 may be manufactured in several ways. One method of manufacture may include inserting the airfoil preform 16 with the airfoil core tube 24, airfoil trailing edge fill body 28, and the airfoil cover ply 26 already formed into an airfoil shaped aperture formed in the platform braid preform 18, layering the extension fill body 50 around the outside of the airfoil foot print at the interface between the platform 18 and the mount extension 20, layering the extension over ply 52 over the components of the airfoil 16 extending out of the primary gas path 22 and the extension fill body 50, layering the platform ply 48 over the extension over ply 52, infiltrating the entire component to form an integral single piece turbine vane 12. The method may also include machining datum features 56 in the mount extension 20 to locate the turbine vane 12 relative to the support structure 14.

Figures 4, 5, 6:
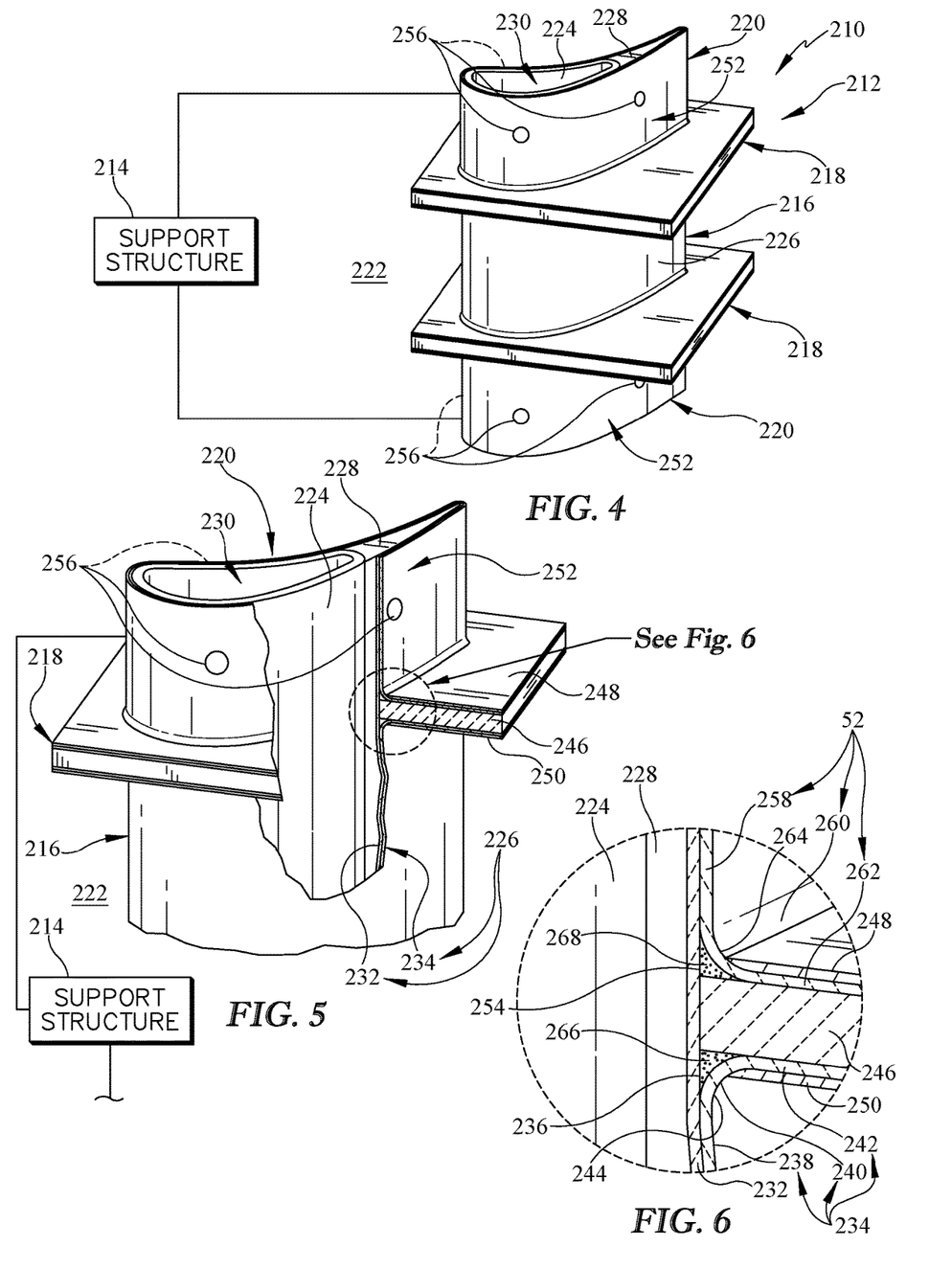
FIG. 4 is a perspective view of a second turbine vane comprising ceramic matrix composite material for use in a gas turbine engine showing that the vane includes an airfoil shaped to redirect air moving through a primary gas path in the gas turbine engine, inner and outer platforms that define a boundary of the primary gas path, and inner and outer mount extensions that extend outside the primary gas path to provide a point of coupling for attaching the turbine vane to a support structure.
FIG. 5 is a detail view of the turbine vane of FIG. 4 showing a portion of an airfoil cover ply included in the airfoil and a portion of the extension over ply included in the mount extension broken away to show an airfoil core tube and an airfoil trailing edge fill body of the airfoil extending out of the gas path and the separate layers forming the platform and the mount extension which together to form an integral one piece turbine vane.
FIG. 6 is a detail view of the turbine vane of FIG. 5 showing the airfoil cover ply includes an interior cover ply and an exterior cover ply that provides a radius at the interface of the platform and the airfoil and showing the extension over ply includes a mount portion that provides the outer surface of the mount extension, a fillet portion shaped to provide a radius at the interface of the platform and mount extension, and a retainer portion that extends over a radially facing surface of the platform and sandwiched between a platform panel and an exterior platform ply included in the platform.

A portion of a second vane ring assembly 210 for use in a gas turbine engine is shown illustratively in FIG. 4. The vane ring assembly 210 is made up of a plurality of individual turbine vanes 212 and a support structure 214. The turbine vanes 212 comprise ceramic matrix composite materials and are arranged circumferentially adjacent to one another to form a ring that extends around a central axis. The support structure 214, shown diagrammatically in FIG. 4, comprises metallic materials and engages a mount extension 220 included in the turbine vane 212 to couple the turbine vane 212 to the support structure 214 to provide a simply supported load path from an airfoil 216 of the turbine vane 212 to the support structure 214 so that aerodynamic loading of the airfoil 216 may be directly transmitted from the airfoil 216 to the support structure 214. In some embodiments, the support structure 214 may be adapted for mounting in a ring or to a turbine case included in the vane ring assembly 210.

The turbine vane 212 includes an airfoil 216, inner and outer platforms 218, and inner and outer mount extensions 220 as shown in FIGS. 4-6. The airfoil 216 is shaped to redirect air moving through a primary gas path 222 within the gas turbine engine. The platforms 218 extend circumferentially from the airfoil 216 at least partway about the central axis to define a boundary of the primary gas path 222. In the illustrative embodiment, at least some components of the airfoil 216 are arranged within an airfoil footprint of the airfoil 216 arranged in the primary gas path 222 when the turbine vane 212 is viewed in a radially-inwardly looking direction toward the central axis. The mount extensions 220 extend outside the primary gas path 222 to provide a point of coupling for attaching the turbine vane 212 to a support structure 214.

The mount extension 220 includes at least some components of the airfoil 216 that extend through the platform 218 and out of the primary gas path 222 so that aerodynamic loading of the airfoil may be directly transmitted from the airfoil 216 to the support structure 214. In the illustrative embodiment, the mount extension 220 includes all of the components that extends through the platform 218 and out of the primary gas path 222.

In the illustrative embodiment, the airfoil 216, the platforms 218, and the mount extensions 220 come together to form one integral single piece turbine vane 212 as shown in FIG. 4. The interface between the airfoil 216, the platform 218, and the mount extension 220 forms a joint therebetween. The joint is reinforced with several reinforcement layers comprising ceramic matrix composite material that are arranged to form a fillet on either side of the joint. The layers and fillet reinforcing the joint between the airfoil 216, the platform 218, and the mount extension 220 once assembled are infiltrated with matrix material to create one integral single piece turbine vane with no air leakage between the airfoil 216 and the platforms 218.

The construction of the turbine vane 212 is shown in the illustrative embodiments of FIGS. 4-6. The airfoil 216 includes an airfoil core tube 224, an airfoil cover ply 226, and an airfoil trailing edge fill body 228 as shown in FIGS. 4-6. The airfoil core tube 224 is shaped to form a passageway 230 that extends radially through the airfoil 216. The airfoil cover ply 226 is arranged around the airfoil core tube 224 and the airfoil trailing edge fill body 228 to provide an outer surface of the airfoil 216 within the primary gas path 222. The airfoil cover ply 226 shields the airfoil core tube 224 and the airfoil trailing edge fill body 228 from air moving through the primary gas path 222. The airfoil trailing edge fill body 228 is shaped to form the trailing edge of the airfoil 216. In the illustrative embodiment, the airfoil core tube 224, the airfoil cover ply 226, and the airfoil trailing edge fill body 228 all extend through the platform 218 and out of the primary gas path 222 to provide part of the mount extension 220.

In the illustrative embodiment, the airfoil cover ply 226 includes an airfoil interior cover ply 232 and an airfoil exterior cover ply 234 as shown in FIG. 6. The interior cover ply 232 is arranged around the airfoil core tube 224 and the airfoil trailing edge fill body 228 and extends between a radially outermost end of the turbine vane 212 and a radially innermost end of the turbine vane 212. The exterior cover ply 234 is arranged around the airfoil core tube 224, the airfoil trailing edge fill body 228, and the interior cover ply 232 within the primary gas path 222.

The airfoil 216 further includes an airfoil fill body 236 as shown in FIGS. 5 and 6. The airfoil fill body 236 is arranged around at least some of the components of the airfoil 216 inside of the primary gas path 222 at the interface of the platform 218 and the airfoil 216. In the illustrative embodiment, the airfoil fill body 236 is arranged around the airfoil core tube 224, the airfoil interior cover ply 232, and the airfoil trailing edge fill body 228. The airfoil exterior cover ply 234 engages the airfoil fill body 236.

In the illustrative embodiments, the airfoil exterior cover ply 234 includes an airfoil portion 238, a fillet portion 240, and a retainer portion 242 as shown in FIG. 6. The airfoil portion 238 provides the inner surface of the airfoil 216 interacting with the air moving through the primary gas path 222. The fillet portion 240 extends radially from the airfoil portion 238 toward the platform 218. The fillet portion 240 is shaped to provide a radius 244 at the interface of the platform 218 and the airfoil 216 and engages the airfoil fill body 236. The retainer portion 242 extends circumferentially along a radially facing surface of platform 218.

In some embodiments, the airfoil cover ply 226 may have excess material that extends from the trailing edge of the airfoil 16. The excess of material would allow for trailing edge machining operations and improve the aerodynamics of the airfoil 216. However, the portion of the airfoil trailing edge fill body 228 and airfoil cover ply 226 outside of the gas path 222 forming the mount extension 220 would not be machined.

The platform 218 includes platform panel 246, an exterior platform ply 248, and an interior platform ply 250 as shown in FIGS. 5 and 6. The platform panel 246 extends circumferentially from the airfoil 216 at least partway about the central axis to define a boundary of the primary gas path 222. The exterior platform ply 248 is arranged so that it forms a radially facing outer surface of the platform 218. The interior platform ply 250 is arranged so that it forms a radially facing inner surface of the platform 218.

The mount extension 220 further includes an extension over ply of reinforcement material 252, an extension fill body 254, and a plurality of datum features 256 as shown in FIGS. 4-6. The extension over ply 252 is arranged around at least some of the components of the airfoil 216 outside of the primary gas path 222 to provide an outer surface of the mount extension 220 facing circumferentially relative to the central axis away from the components of the airfoil 216 outside the primary gas path 222. The extension fill body 254 is arranged around at least some of the components of the airfoil 216 outside of the primary gas path 222 at the interface of the platform 218 and the mount extension 220. The plurality of datum features 256 extend out of the airfoil footprint when the turbine vane 212 is viewed in a radially-inwardly looking direction toward the central axis. The plurality of datum features 256 are configured to be machined so as to control location of the turbine vane 212 relative to the support structure 214.

In the illustrative embodiment, the datum features 256 extend outside of the airfoil footprint when the turbine vane is viewed in a radially-inwardly looking direction toward the central axis and directly engage the support structure 214. The direct engagement of the datum features 256 to the support structure 214 allows for the aerodynamic load to be transferred from the airfoil 216 to the support structure 214.

In the illustrative embodiment, the datum features 256 have a circular cross-sectional shape when viewed from a side of the turbine vane 212. In other embodiments, the datum features 256 may have other suitable cross-sectional shapes.

In the illustrative embodiment, the extension over ply 252 is arranged around the airfoil core tube 224, the airfoil cover ply 226, and the airfoil trailing edge fill body 228. In other embodiments, the extension over ply 252 may be arranged around only the airfoil core tube 224.

The extension over ply of reinforcement material 252 includes a mount portion 258, a fillet portion 260, and a retainer portion 262 as shown in FIGS. 5 and 6. The mount portion 258 provides the outer surface of the mount extension 220. The fillet portion 260 extends radially from the mount portion 258 toward the platform 218. The fillet portion 260 is shaped to provide a radius 264 at the interface of the platform 218 and the mount extension 220 and engages the extension fill body 254. The retainer portion 262 extends circumferentially along a radially facing surface of platform 218 and is sandwiched radially between the platform panel 246 and the exterior platform ply 248 of the platform 218.

In the illustrative embodiment, the retainer portion 242 of the airfoil exterior cover ply 234 is sandwiched radially between the platform panel 246 and the interior platform ply 250. The layering of the different ply and fill body components 232, 234, 236, 248, 250, 252, 254 reinforces and seal the joint between the airfoil 216, the platform 218, and the mount extension 220 so that no air leaks from the primary gas path 222. In the illustrative embodiment, the layering of the different components is located at the joint both outside of the gas path 222 and within the gas path 222. In other embodiments, layering may only be included at the joint outside of the primary gas path 222.

In the illustrative embodiment, the radius 244 of the fillet portion 240 of the airfoil exterior cover ply 234 is complementary to a radius 266 of the airfoil fill body 236. Further, the radius 264 of the fillet portion 260 of the extension over ply 252 is also complementary to a radius 268 of the extension fill body 254. In some embodiments, the fill bodies 236, 254 may increase in size and therefore resulting in the fillet portions 240, 260 having a greater radius. In other embodiments, the mount portion 258 of the extension over ply 252 may have a greater thickness so that the datum features 256 may be machined more easily.

The turbine vane 212 may be manufactured in several ways. One method of manufacture may include inserting the airfoil preform 216 with the airfoil core tube 224, airfoil trailing edge fill body 228, and the airfoil cover ply 226 already formed into an airfoil shaped aperture formed in the platform braid preform 218, layering the extension fill body 254 around the outside of the airfoil footprint at the interface between the platform 218 and the mount extension 220, layering the extension over ply 252 over the components of the airfoil 216 extending out of the primary gas path 222 and the extension fill body 254, layering the exterior platform ply 248 over the extension over ply 252, infiltrating the entire component to form an integral single piece turbine vane 212. The method may also include machining datum features 256 in the mount extension 220 to locate the turbine vane 212 relative to the support structure 214.

Figure 7:
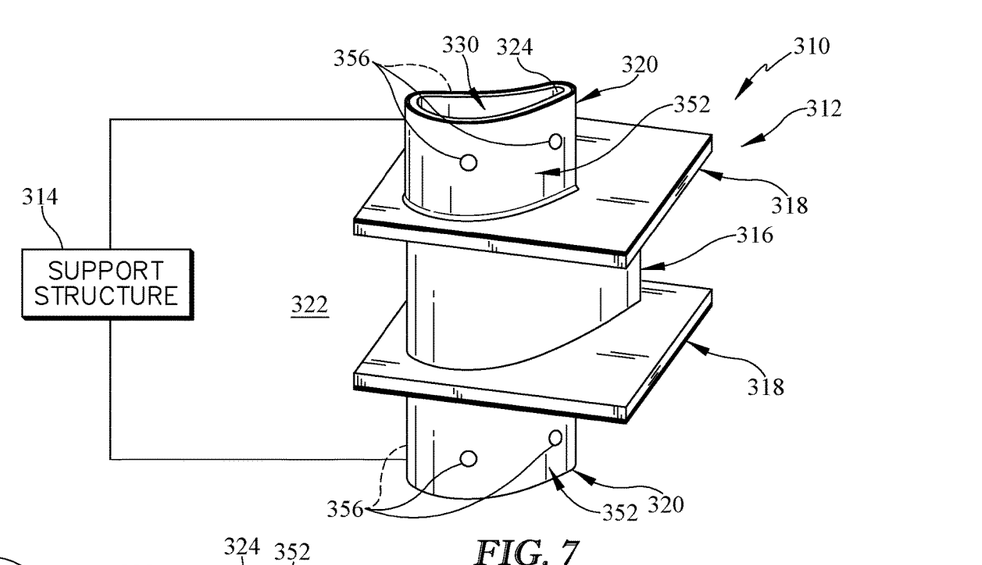
FIG. 7 is a perspective view of a third turbine vane comprising ceramic matrix composite material adapted for use in a gas turbine engine showing that the vane includes an airfoil shaped to redirect air moving through a primary gas path in the gas turbine engine, inner and outer platforms that define a boundary of the primary gas path, and inner and outer mount extensions that extend outside the primary gas path to provide a point of coupling for attaching the turbine vane to a support structure.

A portion of a third vane ring assembly 310 for use in a gas turbine engine is shown illustratively in FIG. 7. The vane ring assembly 310 is made up of a plurality of individual turbine vanes 312 and a support structure 314. The turbine vanes 312 comprise ceramic matrix composite materials and are arranged circumferentially adjacent to one another to form a ring that extends around a central axis. The support structure 314, shown diagrammatically in FIG. 7, comprises metallic materials and engages a mount extension 320 included in the turbine vane 312 to couple the turbine vane 312 to the support structure 314 to provide a simply supported load path from an airfoil 136 of the turbine vane 312 to the support structure 314 so that aerodynamic loading of the airfoil 316 may be directly transmitted from the airfoil 316 to the support structure 314. In some embodiments, the support structure 314 may be adapted for mounting in a ring or to a turbine case included in the vane ring assembly 310.

Figures 8, 9:
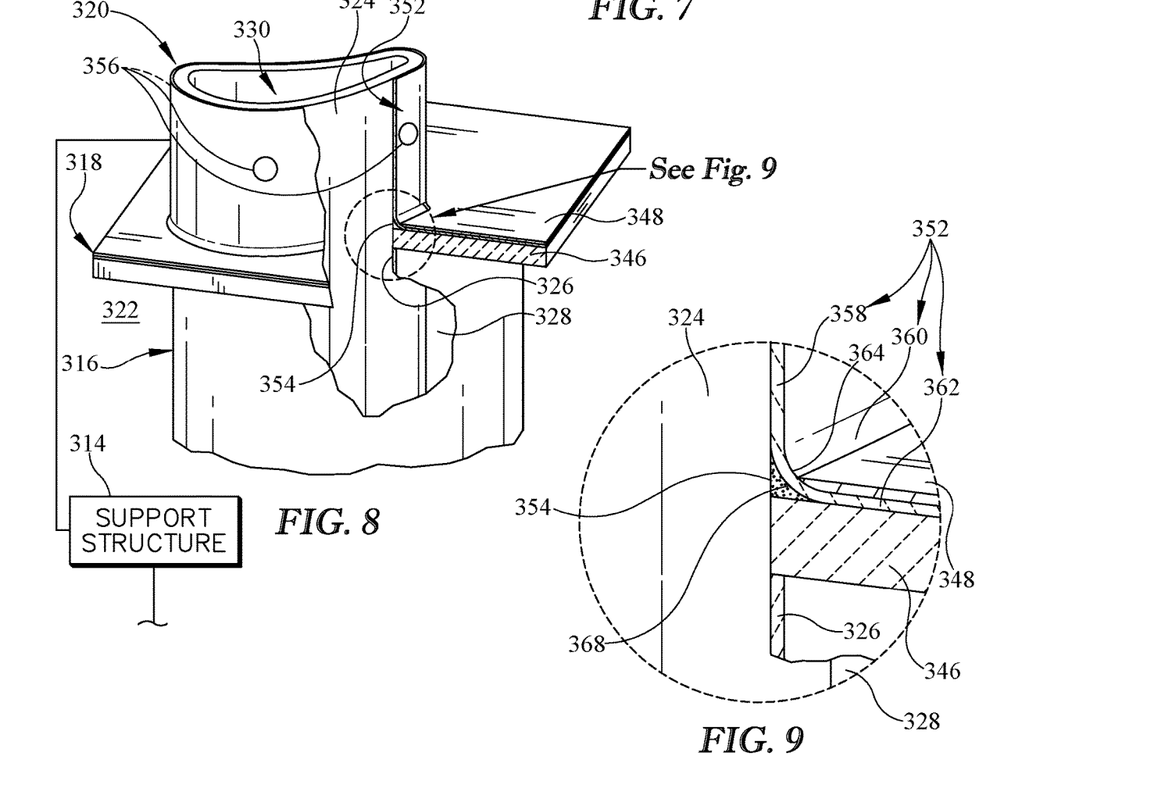
FIG. 8 is a detail view of the turbine vane of FIG. 7 showing a portion of an airfoil cover ply included in the airfoil and a portion of the extension over ply included in the mount extension broken away to show an airfoil core tube of the airfoil extending out of the gas path and the separate layers forming the platform and the mount extension which together to form an integral one piece turbine vane.
FIG. 9 is a detail view of the turbine vane of FIG. 8 showing the extension over ply includes a mount portion that provides the outer surface of the mount extension, a fillet portion shaped to provide a radius at the interface of the platform and mount extension, and a retainer portion that extends over a radially facing surface of the platform and sandwiched between a platform panel and a platform ply included in the platform.

The turbine vane 312 includes an airfoil 316, inner and outer platforms 318, and inner and outer mount extensions 320 as shown in FIGS. 7-9. The airfoil 316 is shaped to redirect air moving through a primary gas path 322 within the gas turbine engine. The platforms 318 extend circumferentially from the airfoil 316 at least partway about the central axis to define a boundary of the primary gas path 322. In the illustrative embodiment, at least some components of the airfoil 316 are arranged within an airfoil footprint of the airfoil 316 arranged in the primary gas path 322 when the turbine vane 312 is viewed in a radially-inwardly looking direction toward the central axis. The mount extensions 320 extend outside the primary gas path 322 to provide a point of coupling for attaching the turbine vane 312 to a support structure 314.

The mount extension 320 includes at least some components of the airfoil 316 that extend through the platform 318 and out of the primary gas path 322 so that aerodynamic loading of the airfoil may be directly transmitted from the airfoil 316 to the support structure 314. In the illustrative embodiment, the mount extension 20 includes an airfoil core tube 324 included in the airfoil 316 that extends through the platform 18 and out of the primary gas path 22.

In the illustrative embodiment, the airfoil 316, the platforms 318, and the mount extensions 320 come together to form one integral single piece turbine vane 312 as shown in FIG. 7. The interface between the airfoil 316, the platform 318, and the mount extension 320 forms a joint therebetween. The joint is reinforced with several reinforcement layers comprising ceramic matrix composite material that are arranged to form a fillet at the joint outside of the gas path 322. The layers and fillet reinforcing the joint between the airfoil 316, the platform 318, and the mount extension 320 once assembled are infiltrated with matrix material to create one integral single piece turbine vane with no air leakage between the airfoil 316 and the platforms 318.

The construction of the turbine vane 312 is shown in the illustrative embodiments of FIGS. 7-9. The airfoil 316 includes an airfoil core tube 324, an airfoil cover ply 326, and an airfoil trailing edge fill body 328 as shown in FIGS. 7-9. The airfoil core tube 324 is shaped to form a passageway 330 that extends radially through the airfoil 316. The airfoil cover ply 326 is arranged around the airfoil core tube 324 and the airfoil trailing edge fill body 328 to provide an outer surface of the airfoil 316 within the primary gas path 322. The airfoil cover ply 326 shields the airfoil core tube 324 and the airfoil trailing edge fill body 328 from air moving through the primary gas path 322. The airfoil trailing edge fill body 328 is shaped to form the trailing edge of the airfoil 316. In the illustrative embodiment, only the airfoil core tube 324 extends through the platform 318 and out of the primary gas path 322 to provide part of the mount extension 320.

In some embodiments, the airfoil cover ply 326 may be integrated into the platform 318 by partially extending out of the gas path 322 and interfacing with the platform panel 346 and the extension fill body 354. In another embodiment, the airfoil cover ply 326 may replace the extension fill body 354 and extend further out of the gas path 322 to interface the fillet portion 360 of the extension over ply 352. The platform panel 346 may also be shaped to form a portion of the extension fill body 354 when the airfoil cover ply 326 interfaces the fillet portion 360.

In some embodiments, the airfoil cover ply 326 may have excess material that extends from the trailing edge of the airfoil 316. The excess of material would allow for trailing edge machining operations and improve the aerodynamics of the airfoil 316.

The platform 318 includes platform panel 346 and a platform ply 348 as shown in FIGS. 8 and 9. The platform panel 346 extends circumferentially from the airfoil 316 at least partway about the central axis to define a boundary of the primary gas path 322. The platform ply 348 is arranged so that it forms a radially facing outer surface of the platform 318.

The mount extension 320 further includes an extension over ply of reinforcement material 352, an extension fill body 354, and a plurality of datum features 356 as shown in FIGS. 7-9. The extension over ply 352 is arranged around at least some of the components of the airfoil 316 outside of the primary gas path 322 to provide an outer surface of the mount extension 320 facing circumferentially relative to the central axis away from the components of the airfoil 316 outside the primary gas path 322. The extension fill body 354 is arranged around at least some of the components of the airfoil 316 outside of the primary gas path 322 at the interface of the platform 318 and the mount extension 320. The plurality of datum features 356 extend out of the airfoil footprint when the turbine vane 312 is viewed in a radially-inwardly looking direction toward the central axis. The plurality of datum features 356 are configured to be machined so as to control location of the turbine vane 312 relative to the support structure 314.

In the illustrative embodiment, the datum features 356 extend outside of the airfoil footprint when the turbine vane is viewed in a radially-inwardly looking direction toward the central axis and directly engage the support structure 314.

The direct engagement of the datum features 356 to the support structure allows for the aerodynamic load to be transferred from the airfoil 316 to the support structure 314.

In the illustrative embodiment, the datum features 356 have a circular cross-sectional shape when viewed from a side of the turbine vane 312. In other embodiments, the datum features 356 may have other suitable cross-sectional shapes.

In the illustrative embodiment, the extension over ply 352 is arranged around the airfoil core tube 324. In other embodiments, the extension over ply 352 may be arranged around other components of the airfoil 316.

The extension over ply of reinforcement material 352 includes a mount portion 358, a fillet portion 360, and a retainer portion 362 as shown in FIGS. 8 and 9. The mount portion 358 provides the outer surface of the mount extension 320. The fillet portion 360 extends radially from the mount portion 358 toward the platform 318. The fillet portion 360 is shaped to provide a radius 364 at the interface of the platform 318 and the mount extension 320 and engages the extension fill body 354. The retainer portion 362 extends circumferentially along a radially facing surface of platform 318 and is sandwiched radially between the platform panel 346 and the platform ply 348 of the platform 318.

The layering of the different ply and fill body components 348, 352, 354 reinforces and seal the joint between the airfoil 316, the platform 318, and the mount extension 320 so that no air leaks from the primary gas path 322. In the illustrative embodiment, the layering of the different components is located at the joint outside of the gas path 322. In other embodiments, additional layering may be included at the joint within the primary gas path 322.

In the illustrative embodiment, the radius 364 of the fillet portion 360 of the extension over ply 352 is complementary to a radius 366 of the extension fill body 354. In some embodiments, the extension fill body 354 may increase in size and therefore resulting in the fillet portion 360 of the extension over ply 352 having a greater radius. In other embodiments, the mount portion 358 of the extension over ply 352 may have a greater thickness so that the datum features 356 may be machined more easily.

The turbine vane 312 may be manufactured in several ways. One method of manufacture may include inserting the airfoil preform 316 with the airfoil core tube 324, airfoil trailing edge fill body 328, and the airfoil cover ply 326 already formed into an airfoil shaped aperture formed in the platform braid preform 318, layering the extension fill body 350 around the outside of the airfoil footprint at the interface between the platform 318 and the mount extension 320, layering the extension over ply 352 over the components of the airfoil 316 extending out of the primary gas path 22 and the extension fill body 50, layering the platform ply 348 over the extension over ply 352, infiltrating the entire component to form an integral single piece turbine vane 312. The method may also include machining datum features 356 in the mount extension 320 to locate the turbine vane 312 relative to the support structure 314.

Figure 10:
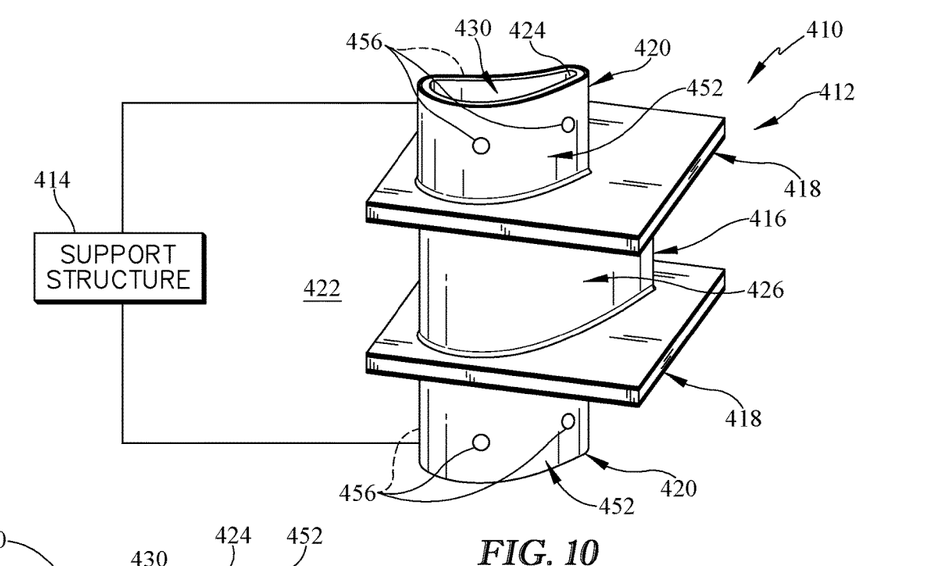
FIG. 10 is a perspective view of a fourth turbine vane comprising ceramic matrix composite material for use in a gas turbine engine showing that the vane includes an airfoil shaped to redirect air moving through a primary gas path in the gas turbine engine, inner and outer platforms that define a boundary of the primary gas path, and inner and outer mount extensions that extend outside the primary gas path to provide a point of coupling for attaching the turbine vane to a support structure.

A portion of a fourth vane ring assembly 410 for use in a gas turbine engine is shown illustratively in FIG. 10. The vane ring assembly 410 is made up of a plurality of individual turbine vanes 412 and a support structure 414. The turbine vanes 412 comprise ceramic matrix composite materials and are arranged circumferentially adjacent to one another to form a ring that extends around a central axis. The support structure 414, shown diagrammatically in FIG. 10, comprises metallic materials and engages a mount extension 420 included in the turbine vane 412 to couple the turbine vane 412 to the support structure 414 to provide a simply supported load path from an airfoil 416 of the turbine vane 412 to the support structure 414 so that aerodynamic loading of the airfoil 416 may be directly transmitted from the airfoil 416 to the support structure 414. In some embodiments, the support structure 414 may be adapted for mounting in a ring or to a turbine case included in the vane ring assembly 410.

Figures 11, 12:
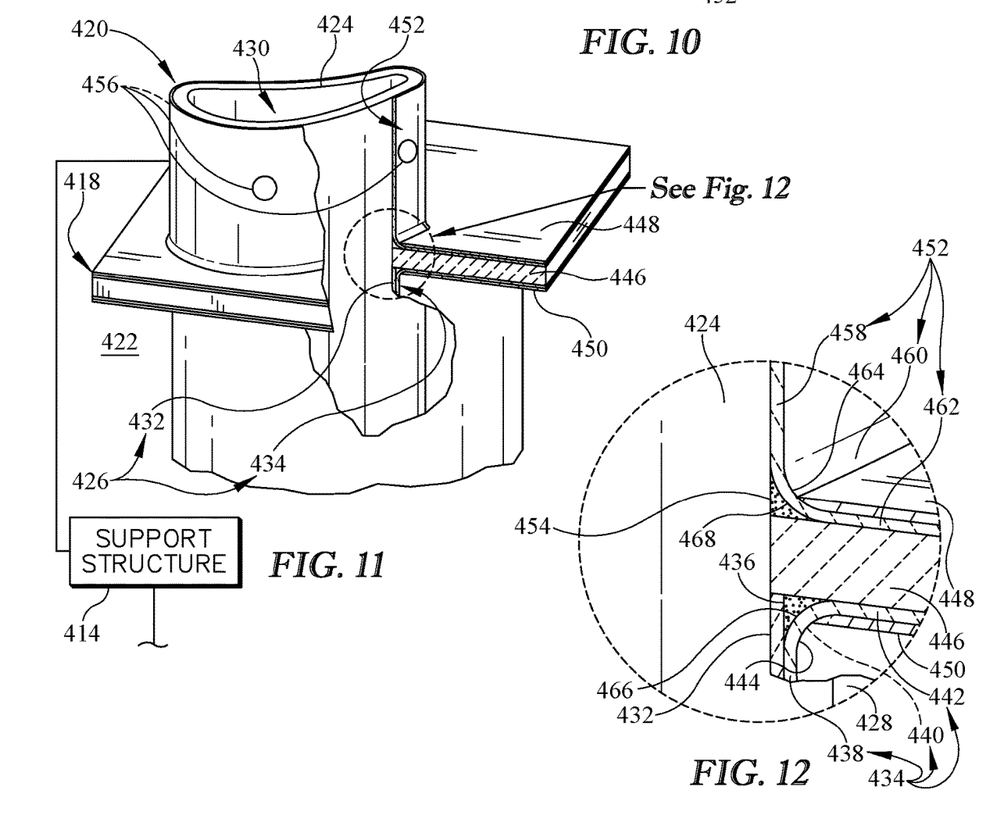
FIG. 11 is a detail view of the turbine vane of FIG. 10 showing a portion of an airfoil cover ply included in the airfoil and a portion of the extension over ply included in the mount extension broken away to show an airfoil core tube of the airfoil extending out of the gas path and the separate layers forming the platform and the mount extension which together to form an integral one piece turbine vane.
FIG. 12 is a detail view of the turbine vane of FIG. 11 showing the airfoil cover ply includes an interior cover ply and an exterior cover ply that provides a radius at the interface of the platform and the airfoil and showing the extension over ply includes a mount portion that provides the outer surface of the mount extension, a fillet portion shaped to provide a radius at the interface of the platform and mount extension, and a retainer portion that extends over a radially facing surface of the platform and sandwiched between a platform panel and an exterior platform ply included in the platform.

The turbine vane 412 includes an airfoil 416, inner and outer platforms 418, and inner and outer mount extensions 420 as shown in FIGS. 10-12. The airfoil 416 is shaped to redirect air moving through a primary gas path 422 within the gas turbine engine. The platforms 418 extend circumferentially from the airfoil 416 at least partway about the central axis to define a boundary of the primary gas path 422. In the illustrative embodiment, at least some components of the airfoil 416 are arranged within an airfoil footprint of the airfoil 416 arranged in the primary gas path 422 when the turbine vane 412 is viewed in a radially-inwardly looking direction toward the central axis. The mount extensions 420 extend outside the primary gas path 422 to provide a point of coupling for attaching the turbine vane 412 to a support structure 414.

The mount extension 420 includes at least some components of the airfoil 416 that extend through the platform 418 and out of the primary gas path 422 so that aerodynamic loading of the airfoil may be directly transmitted from the airfoil 416 to the support structure 414. In the illustrative embodiment, the mount extension 420 includes an airfoil core tube 426 included in the airfoil 416 that extends through the platform 418 and out of the primary gas path 422.

In the illustrative embodiment, the airfoil 416, the platforms 418, and the mount extensions 420 come together to form one integral single piece turbine vane 412 as shown in FIG. 10. The interface between the airfoil 416, the platform 418, and the mount extension 420 forms a joint therebetween. The joint is reinforced with several reinforcement layers comprising ceramic matrix composite material that are arranged to form a fillet on either side of the joint. The layers and fillet reinforcing the joint between the airfoil 416, the platform 418, and the mount extension 420 once assembled are infiltrated with matrix material to create one integral single piece turbine vane with no air leakage between the airfoil 416 and the platforms 418.

The construction of the turbine vane 412 is shown in the illustrative embodiments of FIGS. 10-12. The airfoil 416 includes an airfoil core tube 424, an airfoil cover ply 426, and an airfoil trailing edge fill body 428 as shown in FIGS. 10-12. The airfoil core tube 424 is shaped to form a passageway 430 that extends radially through the airfoil 416. The airfoil cover ply 426 is arranged around the airfoil core tube 424 and the airfoil trailing edge fill body 428 to provide an outer surface of the airfoil 416 within the primary gas path 422. The airfoil cover ply 426 shields the airfoil core tube 424 and the airfoil trailing edge fill body 428 from air moving through the primary gas path 422. The airfoil trailing edge fill body 428 is shaped to form the trailing edge of the airfoil 416. In the illustrative embodiment, only the airfoil core tube 424 extends through the platform 418 and out of the primary gas path 422 to provide part of the mount extension 420.

In the illustrative embodiment, the airfoil cover ply 426 includes an airfoil interior cover ply 432 and an airfoil exterior cover ply 434 as shown in FIG. 12. The interior cover ply 432 is arranged around the airfoil core tube 424 and the airfoil trailing edge fill body 428 and extends between the platforms 418 in the primary gas path 422. The exterior cover ply 434 is arranged around the airfoil core tube 424, the airfoil trailing edge fill body 428, and the interior cover ply 432 within the primary gas path 422.

The airfoil 416 further includes an airfoil fill body 436 as shown in FIGS. 11 and 12. The airfoil fill body 436 is arranged around at least some of the components of the airfoil 416 inside of the primary gas path 422 at the interface of the platform 418 and the airfoil 416. In the illustrative embodiment, the airfoil fill body 436 is arranged around the airfoil core tube 424, the airfoil interior cover ply 432, and the airfoil trailing edge fill body 428. The airfoil exterior cover ply 434 engages the airfoil fill body 436.

In the illustrative embodiments, the airfoil interior cover ply 432 includes an airfoil portion 438, a fillet portion 440, and a retainer portion 442 as shown in FIG. 12. The airfoil portion 438 provides the inner surface of the airfoil 416 interacting with the air moving through the primary gas path 422. The fillet portion 440 extends radially from the airfoil portion 438 toward the platform 418. The fillet portion 440 is shaped to provide a radius 444 at the interface of the platform 418 and the airfoil 416 and engages the airfoil fill body 436. The retainer portion 442 extends circumferentially along a radially facing surface of platform 418.

In some embodiments, the airfoil cover ply 426 may have excess material that extends from the trailing edge of the airfoil 416. The excess of material would allow for trailing edge machining operations and improve the aerodynamics of the airfoil 416.

The platform 418 includes platform panel 446, an exterior platform ply 448, and an interior platform ply 450 as shown in FIGS. 11 and 12. The platform panel 446 extends circumferentially from the airfoil 416 at least partway about the central axis to define a boundary of the primary gas path 422. The exterior platform ply 448 is arranged so that it forms a radially facing outer surface of the platform 418. The interior platform ply 450 is arranged so that it forms a radially facing inner surface of the platform 418.

The mount extension 420 further includes an extension over ply of reinforcement material 452, an extension fill body 454, and a plurality of datum features 456 as shown in FIGS. 10-12. The extension over ply 452 is arranged around at least some of the components of the airfoil 416 outside of the primary gas path 422 to provide an outer surface of the mount extension 420 facing circumferentially relative to the central axis away from the components of the airfoil 416 outside the primary gas path 422. The extension fill body 454 is arranged around at least some of the components of the airfoil 416 outside of the primary gas path 422 at the interface of the platform 418 and the mount extension 420. The plurality of datum features 456 extend out of the airfoil footprint when the turbine vane 412 is viewed in a radially-inwardly looking direction toward the central axis. The plurality of datum features 456 are configured to be machined so as to control location of the turbine vane 412 relative to the support structure 414.

In the illustrative embodiment, the datum features 456 extend outside of the airfoil footprint when the turbine vane is viewed in a radially-inwardly looking direction toward the central axis and directly engage the support structure 414. The direct engagement of the datum features 456 to the support structure allows for the aerodynamic load to be transferred from the airfoil 416 to the support structure 414.

In the illustrative embodiment, the datum features 456 have a circular cross-sectional shape when viewed from a side of the turbine vane 412. In other embodiments, the datum features 456 may have other suitable cross-sectional shapes.

In the illustrative embodiment, the extension over ply 452 is arranged around the airfoil core tube 424 extending outside of the primary gas path 422. In other embodiments, the extension over ply 252 may be arranged around other components of the airfoil 416.

The extension over ply of reinforcement material 452 includes a mount portion 458, a fillet portion 460, and a retainer portion 462 as shown in FIGS. 11 and 12. The mount portion 458 provides the outer surface of the mount extension 420. The fillet portion 460 extends radially from the mount portion 458 toward the platform 418. The fillet portion 460 is shaped to provide a radius 464 at the interface of the platform 418 and the mount extension 420 and engages the extension fill body 454. The retainer portion 462 extends circumferentially along a radially facing surface of platform 418 and is sandwiched radially between the platform panel 446 and the exterior platform ply 448 of the platform 418.

In the illustrative embodiment, the retainer portion 442 of the airfoil exterior cover ply 434 is sandwiched radially between the platform panel 446 and the interior platform ply 450. The layering of the different ply and fill body components 432, 434, 436, 448, 450, 452, 454 reinforces and seal the joint between the airfoil 416, the platform 418, and the mount extension 420 so that no air leaks from the primary gas path 422. In the illustrative embodiment, the layering of the different components is located at the joint both outside of the gas path 422 and within the gas path 422. In other embodiments, layering may only be included at the joint outside of the primary gas path 422.

In the illustrative embodiment, the radius 444 of the fillet portion 440 of the airfoil exterior cover ply 434 is complementary to a radius 466 of the airfoil fill body 436. Further, the radius 464 of the fillet portion 460 of the extension over ply 452 is also complementary to a radius 468 of the extension fill body 454. In some embodiments, the fill bodies 436, 454 may increase in size and therefore resulting in the fillet portions 440, 460 having a greater radius. In other embodiments, the mount portion 458 of the extension over ply 452 may have a greater thickness so that the datum features 456 may be machined more easily.

The turbine vane 412 may be manufactured in several ways. One method of manufacture may include inserting the airfoil preform 416 with the airfoil core tube 424, airfoil trailing edge fill body 428, and the airfoil cover ply 426 already formed into an airfoil shaped aperture formed in the platform braid preform 418, layering the extension fill body 454 around the outside of the airfoil footprint at the interface between the platform 418 and the mount extension 420, layering the extension over ply 452 over the components of the airfoil 416 extending out of the primary gas path 422 and the extension fill body 454, layering the exterior platform ply 448 over the extension over ply 452, infiltrating the entire component to form an integral single piece turbine vane 412. The method may also include machining datum features 456 in the mount extension 420 to locate the turbine vane 412 relative to the support structure 414.

Other methods of manufacture could include a two dimensional layup of the platform around the airfoil preform. Another method of manufacture may include fitting the airfoil preform through the platform preform with an airfoil shaped hole to receive the airfoil preform. Another method could include three dimensionally weaving the vane to produce a single integral structure. Another method of manufacture could include creating the airfoil preform from abutted pressure side and suction side preforms. Any combination of these different methods may also be used to manufacture the turbine vane disclosed.

The manufacture of an integrated turbine vane as described in the present disclosure may be created by pre-forming an airfoil and then adding separate platform pre-forms. The approach works for both inner and outer platforms and produces a ceramic matrix composite vane component with no leakage between the airfoil and the platforms. The integrated airfoil and platform structure or vane created would be inherently gas tight and eliminates the need to seal. The integrated vane may also be one of a vane doublet or triplet.

The profile of the disclosed ceramic matrix composite turbine vane allows for location features or datum features to be machined on to the vane. The locating features can also increase the required tolerance to achieve the required turbine capacity. In some embodiments, the location feature or datum feature may be thicker in size such that sufficient machining stock to meet the location tolerance and retain sufficient wall thickness.

The location feature(s) can be located in cooler regions of the assembly which may reduce the rate of environmental degradation to the ceramic matrix composite component. Applying the location features at the cooler regions of the assembly may also reduce the chemical interaction between the ceramic matrix composite materials and the metallic support structure.

Further, locating the location feature(s) in cooler regions increases the metallic strength and allows from better control of the stresses and overall weight creating a more optimal design. Additionally, locating the location feature(s) in cooler regions increases the metallic stiffness at the interface resulting in reduced deflection of the ceramic matrix composite and metallic components in the system. This reduction in deflection allow for better control of the turbine throat area and/or capacity over the engine running range which is important for maintaining engine performance.

The components of the airfoil that protrude the platform out of the gas path may be made with an increased thickness from the platform. The increased thickness allows for machined datum features or sealing features to be incorporated in the vane.

The vane may be supported at both the inner and outer platforms. The aerodynamic loading is transmitted through a stiff, simply supported structure which in turn minimizes the stresses imparted in the platform to airfoil joint as the joint is a region of high stress.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane comprising
an airfoil made of ceramic matrix composite materials and shaped to redirect air moving through a primary gas path in a gas turbine engine,
a platform made from ceramic matrix composite materials that extends circumferentially from the airfoil at least partway about a central axis to define a boundary of the primary gas path, and
a mount extension that extends outside the primary gas path to provide a point of coupling for attaching the turbine vane to a support structure, the mount extension including at least some components of the airfoil that extends through the platform and out of the primary gas path so that aerodynamic loading of the airfoil may be directly transmitted from the airfoil to the support structure,
wherein the airfoil includes an airfoil core tube shaped to form a passageway that extends radially through the airfoil and an airfoil cover ply arranged around the airfoil core tube to provide an outer surface of the airfoil within the primary gas path shielding the airfoil core tube from the primary gas path,
wherein the airfoil core tube extends through the platform and out of the primary gas path to provide part of the mount extension,
wherein the airfoil core tube is the only component of the airfoil that extends through the platform and out of the primary gas path to provide part of the mount extension, and
wherein the mount extension includes an extension over ply of reinforcement material arranged around the airfoil core tube and in direct confronting relation with the airfoil core tube outside the primary gas path to provide an outer surface of the mount extension facing circumferentially relative to the central axis away from the airfoil core tube of the airfoil outside the primary gas path.

2. The turbine vane assembly of claim 1, wherein the at least some components of the airfoil are arranged within an airfoil footprint of the airfoil arranged in the primary gas path when the turbine vane is viewed in a radially-inwardly looking direction toward the central axis and wherein the mount extension includes a plurality of datum features that extend out of the airfoil footprint when the turbine vane is viewed in a radially-inwardly looking direction toward the central axis, the plurality of datum features configured to be machined so as to control location of the turbine vane relative to the support structure.

3. The turbine vane of claim 1, wherein the extension over ply includes a mount portion that provides the outer surface of the mount extension and a fillet portion that extends radially from the mount portion toward the platform, the fillet portion shaped to provide a radius at the interface of the platform and the mount extension.

4. The turbine vane of claim 3, wherein the extension over ply includes a retainer portion that extends circumferentially along a radially facing surface of the platform.

5. The turbine vane of claim 4, wherein the platform includes a platform panel and a platform ply, and the retainer portion of the extension over ply is sandwiched radially between the platform panel and the platform ply.

6. A vane ring assembly, the assembly comprising
a support structure, and
a turbine vane comprising ceramic matrix composite components, the turbine vane shaped to provide (i) an airfoil made of ceramic matrix composite materials and shaped to redirect air moving through a primary gas path in a gas turbine engine, (ii) a platform made from ceramic matrix composite materials that extends circumferentially from the airfoil at least partway about a central axis to define a boundary of the primary gas path, and (iii) a mount extension that extends outside the primary gas path, the mount extension including at least some components of the airfoil that extends through the platform and out of the primary gas path,
wherein the support structure engages the mount extension of the turbine vane to couple the turbine vane to the support structure and provide a simply supported load path from the airfoil to the support structure so that aerodynamic loading of the airfoil may be directly transmitted from the airfoil to the support structure wherein the mount extension includes an extension over ply of reinforcement material arranged around the at least some components of the airfoil outside the primary gas path to provide an outer surface of the mount extension facing circumferentially relative to the central axis away from the at least some components of the airfoil outside the primary gas path, wherein the extension over ply includes a mount portion that provides the outer surface of the mount extension and a fillet portion that extends radially from the mount portion toward the platform, the fillet portion shaped to provide a radius at the interface of the platform and the mount extension, wherein the extension over ply includes a retainer portion that extends circumferentially along a radially facing surface of the platform, wherein the platform includes a platform panel and a platform ply, and the retainer portion of the extension over ply is sandwiched radially between the platform panel and the platform ply.

7. The assembly of claim 6, wherein the support structure comprises metallic materials.

8. The assembly of claim 6, wherein the support structure is spaced apart from the platform of the turbine vane.

9. The assembly of claim 6, wherein the at least some components of the airfoil are arranged within an airfoil footprint of the airfoil arranged in the primary gas path when the turbine vane is viewed in a radially-inwardly looking direction toward the central axis and wherein the mount extension includes a plurality of datum features that extend out of the airfoil footprint when the turbine vane is viewed in a radially-inwardly looking direction toward the central axis, the plurality of datum features configured to be machined so as to control location of the turbine vane relative to the support structure.

10. The assembly of claim 6, wherein the airfoil includes an airfoil core tube shaped to form a passageway that extends radially through the airfoil and an airfoil cover ply arranged around the airfoil core tube to provide an outer surface of the airfoil within the primary gas path shielding the airfoil core tube from the primary gas path, and wherein the airfoil core tube extends through the platform and out of the primary gas path to provide part of the mount extension.

11. The assembly of claim 10, wherein the airfoil cover ply extends through the platform and out of the primary gas path to provide part of the mount extension.

* * * * *